(12) United States Patent
Ahrens et al.

(10) Patent No.: US 8,230,505 B1
(45) Date of Patent: Jul. 24, 2012

(54) METHOD FOR COOPERATIVE INTRUSION PREVENTION THROUGH COLLABORATIVE INFERENCE

(75) Inventors: David Ahrens, San Jose, CA (US); Mahalingam Mani, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 896 days.

(21) Appl. No.: 11/502,884

(22) Filed: Aug. 11, 2006

(51) Int. Cl.
*G06F 21/00* (2006.01)

(52) U.S. Cl. ............. 726/23; 705/7.25; 705/5; 709/217; 713/151

(58) Field of Classification Search ...................... 726/23
See application file for complete search history.

(56) References Cited

U.S. PATENT DOCUMENTS

| | | | |
|---|---|---|---|
| 6,088,804 A | 7/2000 | Hill et al. | |
| 6,279,113 B1 | 8/2001 | Vaidya | |
| 6,321,338 B1 | 11/2001 | Porras et al. | |
| 6,427,140 B1 | 7/2002 | Ginter et al. | |
| 6,487,666 B1 * | 11/2002 | Shanklin et al. | 726/23 |
| 6,546,493 B1 | 4/2003 | Magdych et al. | |
| 6,725,377 B1 | 4/2004 | Kouznetsov | |
| 6,839,850 B1 | 1/2005 | Campbell et al. | |
| 6,851,061 B1 | 2/2005 | Holland et al. | |
| 6,948,070 B1 | 9/2005 | Ginter et al. | |
| 6,957,348 B1 | 10/2005 | Flowers et al. | |
| 6,983,380 B2 | 1/2006 | Ko | |
| 6,990,591 B1 | 1/2006 | Pearson | |
| 6,996,843 B1 | 2/2006 | Moran | |
| 7,058,821 B1 | 6/2006 | Parekh et al. | |
| 7,085,936 B1 | 8/2006 | Moran | |
| 7,089,428 B2 | 8/2006 | Farley et al. | |
| 7,107,339 B1 | 9/2006 | Wolters | |
| 7,114,185 B2 | 9/2006 | Moore et al. | |
| 7,237,264 B1 * | 6/2007 | Graham et al. | 726/23 |
| 7,379,891 B1 * | 5/2008 | Donner et al. | 705/5 |
| 7,404,180 B2 * | 7/2008 | Wedel et al. | 717/128 |
| 7,430,760 B2 * | 9/2008 | Townsend et al. | 726/13 |
| 7,533,413 B2 * | 5/2009 | Samuelsson et al. | 726/22 |
| 7,571,485 B1 * | 8/2009 | McCorkendale et al. | 726/26 |
| 7,574,740 B1 * | 8/2009 | Kennis | 726/22 |
| 7,685,254 B2 * | 3/2010 | Pandya | 709/217 |
| 2001/0020272 A1 | 9/2001 | Le Pennec et al. | |
| 2002/0059078 A1 | 5/2002 | Valdes et al. | |
| 2002/0082886 A1 | 6/2002 | Manganaris et al. | |
| 2002/0116607 A1 | 8/2002 | Boies et al. | |
| 2003/0061513 A1 | 3/2003 | Tsafnat et al. | |

(Continued)

FOREIGN PATENT DOCUMENTS

EP 1531379 5/2005

(Continued)

OTHER PUBLICATIONS

Indra: A peer-to-peer approach to network intrusion detection and prevention http://www.ub.uni-konstanz.de/kops/volltexte/2007/2433/pdf/janakiraman03indra.pdf, Jun. 2003 Ramaprabhu Janakiraman, Marcel Waldvogel, Qi Zhang.*

(Continued)

*Primary Examiner* — Taghi Arani
*Assistant Examiner* — Mahfuzur Rahman
(74) *Attorney, Agent, or Firm* — Sheridan Ross P.C.

(57) ABSTRACT

The present invention is directed to an intrusion detection/prevention system that uses application layer event information to identify potential intrusions and notifies remote trusted peers in other enterprise networks of potential intrusions emanating therefrom.

18 Claims, 4 Drawing Sheets

U.S. PATENT DOCUMENTS

| | | | |
|---|---|---|---|
| 2003/0084319 A1 | 5/2003 | Tarquini et al. | |
| 2003/0110396 A1 | 6/2003 | Lewis et al. | |
| 2003/0145225 A1 | 7/2003 | Bruton, III et al. | |
| 2003/0188189 A1 | 10/2003 | Desai et al. | |
| 2003/0217289 A1 | 11/2003 | Ammon et al. | |
| 2004/0064731 A1* | 4/2004 | Nguyen et al. | 713/201 |
| 2005/0038876 A1* | 2/2005 | Chaudhuri | 709/219 |
| 2005/0050378 A1 | 3/2005 | Liang | |
| 2006/0067506 A1* | 3/2006 | Flockhart et al. | 379/265.09 |
| 2006/0178918 A1* | 8/2006 | Mikurak | 705/7 |

FOREIGN PATENT DOCUMENTS

| | | |
|---|---|---|
| WO | 03103214 | 12/2003 |
| WO | 2004/095192 | 11/2004 |
| WO | 2004/100486 | 11/2004 |
| WO | 2005/022441 | 3/2005 |

OTHER PUBLICATIONS

A Software Fault Tree Approach to Requirements Analysis of an Intrusion Detection System|Guy Helmer, Johnny Wong, Mark Slagell, Vasant Honavar, Les Miller, and Robyn Lutzt|pp. 1-14|2000.* http://www.google.com/url?sa=t&rct=j&q=&esrc=s&frm=1 &source=web&cd=4&ved=0CFAQFjAD &url=http%3A%2F%2Fciteseerx.ist.psu. edu%2Fviewdoc%2Fdownload%3Fdoi3D10.1.1.25. 5469%26rep%3Drep1%26type%3Dpdf &ei=YezGTv3eKeLn0QGeyr0q&usg=AFQjCNEcZeO-PGAVWqEwenaFIPNry6FTuA &sig2=ORe3HIKadXPU4h0QJdO_Mw.*

Stiemerling et al.; "Middlebox Communications (MIDCOM) Protocol Semantics"; Network Working Group, Request for Comments: 3989; Available at: http://www.ietf.org/rfc/rfc3989.txt; Feb. 2005; 66 pages; RFC 3989; The Internet Society.

Srisuresh et al.; "Middlebox Communication Architecture and Framework"; Network Working Group, Request for Comments: 3303; Available at: http://www.ietf.org/rfc/rfc3303.txt; Aug. 2002; 32 pages; RFC 3303; The Internet Society.

Swale et al.; "Middlebox Communications (MIDCOM) Protocol Requirements"; Network Working Group, Request for Comments: 3304; Available at: http://www.ietf.org/rfc/rfc3304.txt; Aug. 2002; 9 pages; RFC 3304; The Internet Society.

"Middlebox Communication (MIDCOM)"; Available at http://www.ietf.org/html.charters/midcom-charter.html; Last Modified: Sep. 29, 2004; 3 pages; The Internet Society.

"Internet Telephony Special Focus"; Available at http://www.tmcnet.com/it/0304/SpecialFocus.htm; 2006; 13 pages; Technology Marketing Corporation.

"Session Border Controller"; Wikipedia (free internet encyclopedia); Page Last Modified Jan. 5, 2006; 2 pages; Wikipedia Foundation Inc.

Franklin C; "Which is the Best Intrusion-Protection System?"; Available at http://www.networkingpipeline.com/worksforme/57703174; Jan. 14, 2005; 4 pages; CMP. Media LLC.

"Top Layer White Papers"; Available at http://www.toplayer.com/content/cm/whitePaper_Registration.jsp?source=google &group=IDS_IDS_G&creative=Keyword_IDS; 2005; 4 pages; Top Layer Networks.

"Executive Summary, VOIP Session Border Controllers: A Heavy Reading Competitive Analysis"; Available at http://www.heavyreading.com/details.asp?sku_id=749&skuitem_itemid=731; 2006; 8 pages; Light Reading Inc.

"Nextone Session Border Controller"; Available at http://www.google.com/search?q=cache:sFIXoPeJ48wJ:www.nextone.com/docs/Datasheet_SBC.pdf+%22session+border+controller%22 &hl=en; 2005; 8 pages; NexTone Communications.

"Session Border Controller (SBC)"; Available at http://www.nextone.com/pages/products/cr-en-sbc.htm; 2005; 1 page; NexTone Communications.

"NAT Proxy (NPX)"; Available at http://www.nextone.com/pages/products/cr-en-npx.htm; 2005; 1 page; NexTone Communications.

"Multiprotocol Signaling Switch (MSW)"; Available at http://www.nextone.com/pages/products/cr-en-msw.htm; 2005; 2 page; NexTone Communications.

"iView Management System (iVMS)"; Available at http://www.nextone.com/pages/products/cr-en-ivms.htm; 2005; 2 pages; NexTone Communications.

Summary of: Peterson J; "Enhancements for Authenticated Identity Management in the Session Initiation Protocol (SIP)"; Internet-Draft; May 6, 2005; 40 pages. Summary available at http://www.atm.tut.fi/list-archive/sip-2005/msg00604.html; Summary document is 3 pages long; A 1-page-long web-page indicating that the document is located on a page of The Internet Engineering Task Force site that cannot be found is included.

Guski et al., "Security on Z/OS: Comprehensive, Current and Flexible," IBM Systems Journal, 2001, vol. 40(3), 2001, pp. 696-720.

Helmer et al., "A Software Fault Tree Approach to Requirements Analysis of an Intrusion Detection System," 1st Symposium on Requirements Engineering for Information Security, 2001, Indianapolis, Indiana, 14 pages.

Bass, Tim, "Intrusion Detection Systems and Multisensor Data Fusion," Communications of the ACM, Apr. 2000, vol. 43(4), pp. 100-105.

* cited by examiner

METHOD FOR COOPERATIVE INTRUSION PREVENTION THROUGH COLLABORATIVE INFERENCE

FIELD OF THE INVENTION

The invention relates generally to network security systems and particularly to intrusion prevention systems.

BACKGROUND OF THE INVENTION

As distributed processing networks rise in prominence in the information age, network security is becoming increasingly important to both governmental and nongovernmental entities. In the network security field, "intrusion" is a broad term encompassing many deleterious activities that generally target one or more of data, media, and equipment. Such activities include acquiring information that the would-be acquirer is not authorized to have (known as information theft), rendering a network system or application unusable (known as Denial of Service or DoS), and gaining unauthorized use of a network component as a stepping stone for further intrusions elsewhere. Most intrusions follow a pattern of information gathering, attempted access, and then destructive attacks. As used herein, "attack" refers generally to all types of intrusions (including "scans", "floods", and "attacks" as understood by one of skill in the art).

Attacks, particularly highly sophisticated attacks, are often difficult to detect. In most attacks, the attacker uses "spoofed" packets that are not easily traceable to their true origin. To hide their identities, attackers make unauthorized use of machines or networks of other parties.

A number of systems have been developed to detect attacks.

The most commonly employed system is a firewall, which allows the system or network manager to restrict access to components on the network. At the simplest level, a firewall is a packet filter facility that can restrict the flow of packets to and from a network via a set of rules implemented in an interconnection device. Examples of firewalls include frame-filtering firewalls, packet-filter firewalls, circuit gateway firewalls, and stateful firewalls. Firewalls are not too effective in fine-grained prevention but can complement other types of network security systems. They cannot prevent an attack once the firewall has "approved" entry of a host into the internal network or an attack initiated from within the internal network.

Network-based systems include signature-based and rate-based systems. Signature-based systems rely on an electronic signature, such as a certificate and/or key, to provide a trusted relationship with the source. Such systems need to be configured for signatures of known vulnerabilities and state-sensitive per-session. These systems are unable to prevent only known attacks; that is, the attack signature must be known and deployed to recognize the attack attempt. To make matters worse, signature-based systems find it nearly impossible to detect policy-based violations. The necessary required application-awareness forces such systems to be tuned to limited applications, which creates a scaling issue. Rate-based systems normally create a table of connections originating from a single source to the different destinations in the enterprise network and apply heuristics to the height and width of the table to identify a potential attack profile. Rate-based systems commonly deal only with denial-of-service-type attacks and may often miss DoS attacks, which are more detectable at the higher application layers of the OSI model. Rate-based systems also may need to be deployed in line to receive and process all network traffic. This in line configuration can lead to a single-point of failure scenario, which is a concern for high availability networks.

Anomaly or behavior-based Intrusion Detection Systems (IDS) and Intrusion Prevention Systems (IPS) detect network protocol violations and behavior that violates normal usage patterns. Examples of IDS and IPS systems include U.S. Patent Application Publications 3002/0145225 and 2004/0064731, each of which is incorporated herein by this reference.

The various systems noted above are generally application unaware and therefore frequently unable to detect attacks directed at applications that do not violate network protocols or that fall within normal usage patterns. They are generally limited to layers 2 (data link layer), 3 (network layer), and 4 (transport layer) of the OSI model and fail to take into account information at higher layers in the model. As a result, attacks targeting these higher layers are often undetectable.

Some of the above systems are enabled to perform deep-packet stateful inspections to decipher application-level DoS attempts and resource exhaustions. The inspections, however, cannot inspect encrypted data to perform effective higher-layer traffic and state analysis. Such inspections can not only delay traffic while the traffic is inspected but also make the system unable to scale to support large deployments while continuing to meet the real-time requirements of IP communications.

While it is true that cryptographically strong identity and access management makes it harder for attackers to exploit vulnerabilities from outside the knowledgeable domain (especially at the application layer of the OSI model), some communication protocols, particularly the Session Initiation Protocol or SIP, that enable Voice over Internet Protocol or VoIP and/or instant messaging communications are open forms of communications authorized to receive from the rest of the world. Benign default policies and access control mechanisms can be (and are) enforced, such as whitelists and blacklists, to narrow the list of domains and peers. However, such policies and mechanisms have their limitations and cannot be over done—lest the value of the pervasive communication medium be diluted—especially from the standpoint of mobility. For example, if one needs to call the information technology officer of an enterprise to enable a hotspot domain in their list before performing remote access it is not seamless or ubiquitous but problematic for users.

There has been very little effort except to expand the notion of using in line and access-level OPSs, such as signature, rate-based, protocol-anomaly, and behavior-anomaly systems to combat attacks using open forms of communication.

SUMMARY OF THE INVENTION

These and other needs are addressed by the various embodiments and configurations of the present invention. The present invention is directed generally to the use of application layer event information to identify potential intrusions and/or sending an intrusion notification to a remote trusted peer in a network segment at the intrusion source. The information identifies behavioral violations (both malicious and otherwise) in the networked system.

In one configuration, the application layer event information is commonly generated by one or more targeted communications applications and may be stored in an event log. The configuration can thus allow for the application in the process of its normal processing to deduce malicious access patterns, as evidenced by, for example, errors, exceptions, policy violations, and handling rates. An agent can update the local host's security policy to mitigate the intrusion. Additionally when an intrusion is detected, a trusted cooperative network-aware Intrusion Prevent System and/or Intrusion Detection System is provided with the appropriate information and commences with location and neutralization of the intruder, including blocking the intrusion at or near the source of the intrusion.

This configuration can have a number of advantages. The configuration can provide near-real-time prevention of application-level intrusions and can solve the problems of the prior art by coordinating application layer protection with a networked IDS/IPS system to provide protection at the network layers (e.g., layers 2-4) with application layer protection at layer 7 of the OSI model. Accordingly, the configuration can protect against application-specific intrusions taking advantage of vulnerabilities in communication protocols, such as SIP and H.323. For example, the configuration can detect attacks using single, malformed packets transmitted at low rates to adversely impact the performance of an application but would not be detectable by monitoring events at other layers. When combined with protection at various layers, the invention can protect not only against worms, viruses, and DoS attacks but also against application directed attacks. The configuration does not require extensive changes to existing communication application code for implementation. The agent can simply inform the application to provide event information to the agent and/or the agent can check an event log maintained by the communication application. Implementing the agent at the operating system level can permit the agent to view plain text packet application-level communications as such communications are normally not encrypted. Finally, the agent uses existing logic in the communication applications to identify anomalous behavior.

In another configuration, an IDS/IPS is provided that relies on a web-of-trust with another enterprise to neutralize attacks. The web-of-trust (federated or otherwise) is used to notify a remote trusted peer controller of detected contractual/trust violations. In SIP and other similar protocols, the configuration can leverage an evolving (distributed) web-of-trust distributed between communicating entities. As will be appreciated, the SIP paradigm is based on transitive trust and certificates. The complexity of broad use of end-to-end authentication forces a web-of-trust based transitive model allowing for scalable use of domain identities (e.g., certificates) combined with local SIP-end-entity validations by respective domain servers. Thus, a defacto/standardized adoption of the method riding on the SIP signaling protocol makes this configuration viable for adoption by the security community in the field of IPS/IDS as a reasonable component to enforce threat-space that is not otherwise easily confronted.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
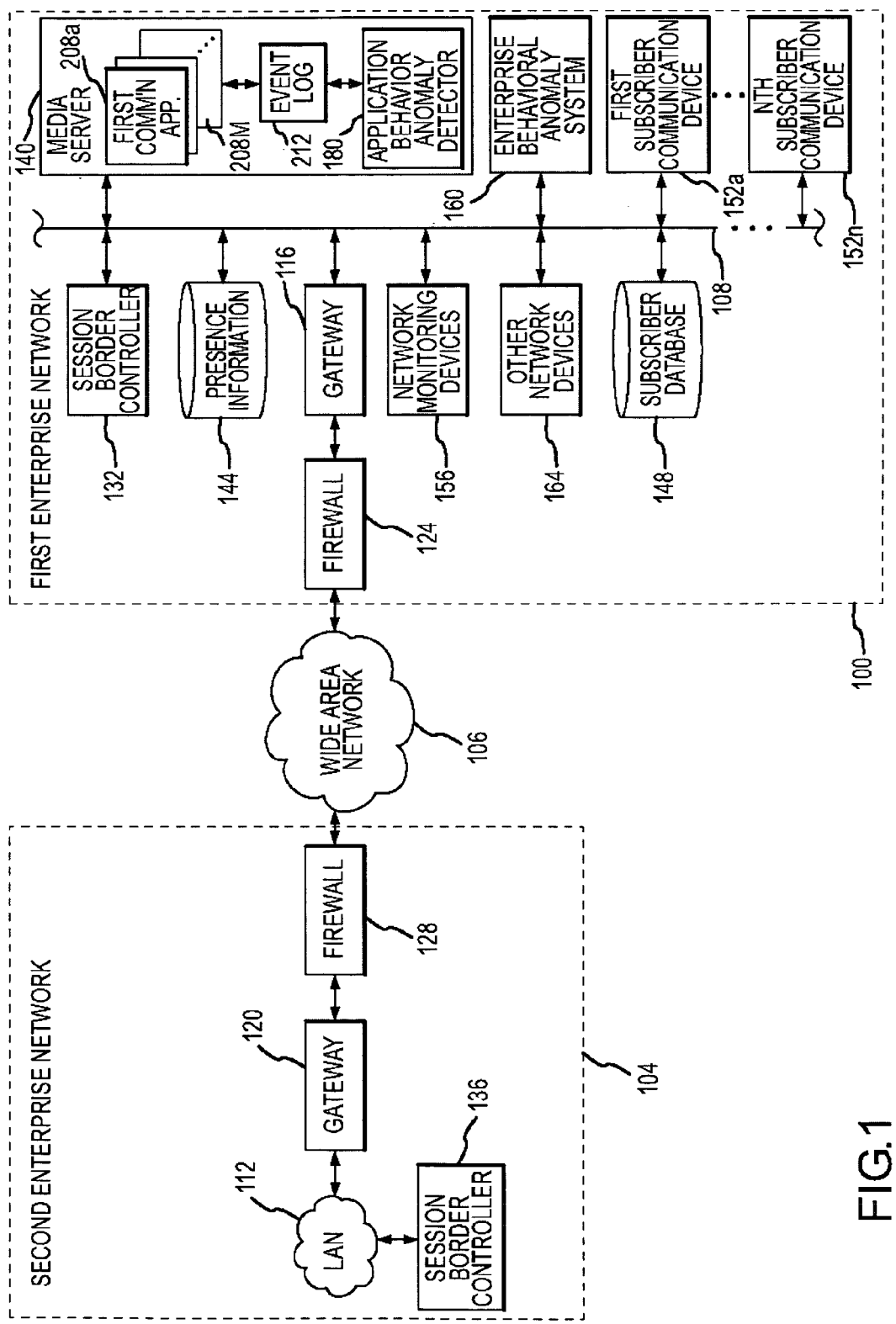
FIG. 1 is a block diagram of a multi-enterprise network architecture according to an embodiment of the present invention.

A first embodiment of the present invention will now be described with reference to FIG. 1. A network architecture is provided that includes first and second enterprise networks 100 and 104 that have a federated relationship with one another. As will be appreciated, "federation" refers to two or more independent or autonomous administrator domains having some kind of an agreement or mutual policy governing how each domain will handle communications with one another. The domains may be associated with different entities, with an exemplary entity being a company, government, individual, service provider, and the like. Federated entities typically have a trusted relationship with one another. For example, two nodes in separate federated entities commonly use digital signature- or key-based validation techniques (e.g., a digital certificate) to implement the web-of-trust.

The first and second enterprise networks are interconnected by a Wide Area Network 106. Each network has a Local Area Network 108 and 112, a gateway 116 and 120, a firewall 124 and 128, and a session border controller 132 and 136. As will be appreciated, the firewall and session border controller may be directly connected. Although the first embodiment is discussed with reference to a Session Initiation Protocol architecture, it is to be understood that the principles of the present invention may be used in other network protocol architectures, including a H.323 protocol network architecture.

The LANs 108 and 112 and WAN 106 may be any type of distributed processing network, with a packet-switched network being preferred. A specific example of the WAN is the Internet.

The gateway 116 and 120 is an electronic signal repeater device that intercepts and steers electrical signals from one network to another. The gateway connects two otherwise incompatible networks (e.g., the Local Area Network 108 and Wide Area Network 106) and performs code and protocol conversion processes.

The firewall 124 and 128 is generally a combination of hardware and software that enforces a boundary between the respective LAN and the WAN. It generally examines incoming traffic at the application level and readdresses outgoing traffic so it appears to have originated from the firewall rather than the internal host.

The session border controller 132 and 136 performs a number of functions, including acting as a presence server, location server, and a registrar. The session border controller is normally positioned in the signaling path between a calling and called communication devices. It behaves as if it is the called communication device and makes a second call to the called communication device. Thus, both the signaling and media traffic for the call pass through the controller.

The first enterprise network 100 further includes a media server 140, presence information and subscriber databases 144 and 148 respectively, first ... nth subscriber communication devices 152*a-n*, network monitoring devices 156, an enterprise behavioral anomaly (prevention) system 160, and other network devices 164.

The media server 140 can be any architecture for directing contacts to one or more communication devices. Illustratively, the server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™, Communication Manager™, or Multi-Vantage™ private-branch exchange (PBX)-based ACD system. The media server typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The server comprises a network interface card to provide services to the subscriber communication devices 152*a-n*.

Presence information and subscriber databases 144 and 148 contain, respectively, subscriber information (including subscriber name, associated electronic addresses, and other information) and presence information about one or more subscribers. A "subscriber" refers to a person who is serviced by, registered or subscribed with, or otherwise affiliated with the enterprise network. Presence information refers to any information associated with a network node and/or endpoint device that is turn associated with a person or identity. Examples of presence information include registration information, information regarding the accessibility of the endpoint device, the endpoint's telephone number or address, the recency of use of the endpoint device by the person, recency of authentication by the person to a network component, the geographic location of the endpoint device, the type of media, format language, session and communications capabilities of the currently available communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted.

The first ... nth subscriber communication devices 152*a-n* can be any communication device suitable for the network to which they are connected. Exemplary communication devices include, for example, IP hardphones, IP softphones, Personal Digital Assistants or PDAs, Personal Computers or PCs, and laptops.

Network monitoring devices 156 collect and optionally analyze network-related information, typically at OSI layers 2-4, to identify attacks. The devices 156 may be any suitable module, with sniffers and scanners being typical. Sniffers operate in a promiscuous mode, examining traffic that passes through on the local network. Sniffers are placed at strategic points in the network, such as in front of the firewall 124, behind the firewall 124, in the network 108, and in front of a host. Sniffers use pattern matching to try to match a packet against a known attack which is expressed as an "attack signature". Scanners look at log files for signs of attacks, which may be detected by inspecting a collection of packets. Scanners therefore do not inspect data packets as they are passing through the network. Instead, they operate in a post-processing mode.

The enterprise behavioral anomaly system 160 uses a variety of information to identify attacks, map and locate the access-level source, and selectively or collectively employ prevention actions, such as honeypotting, configuring Access Control Lists or ACLs on access ports, and notifying remote trusted peer controllers of detected contractual/trust violations. This system is discussed in greater detail below in connection with FIG. 2.

The other network devices 164 include facsimile servers.

Figure 2:
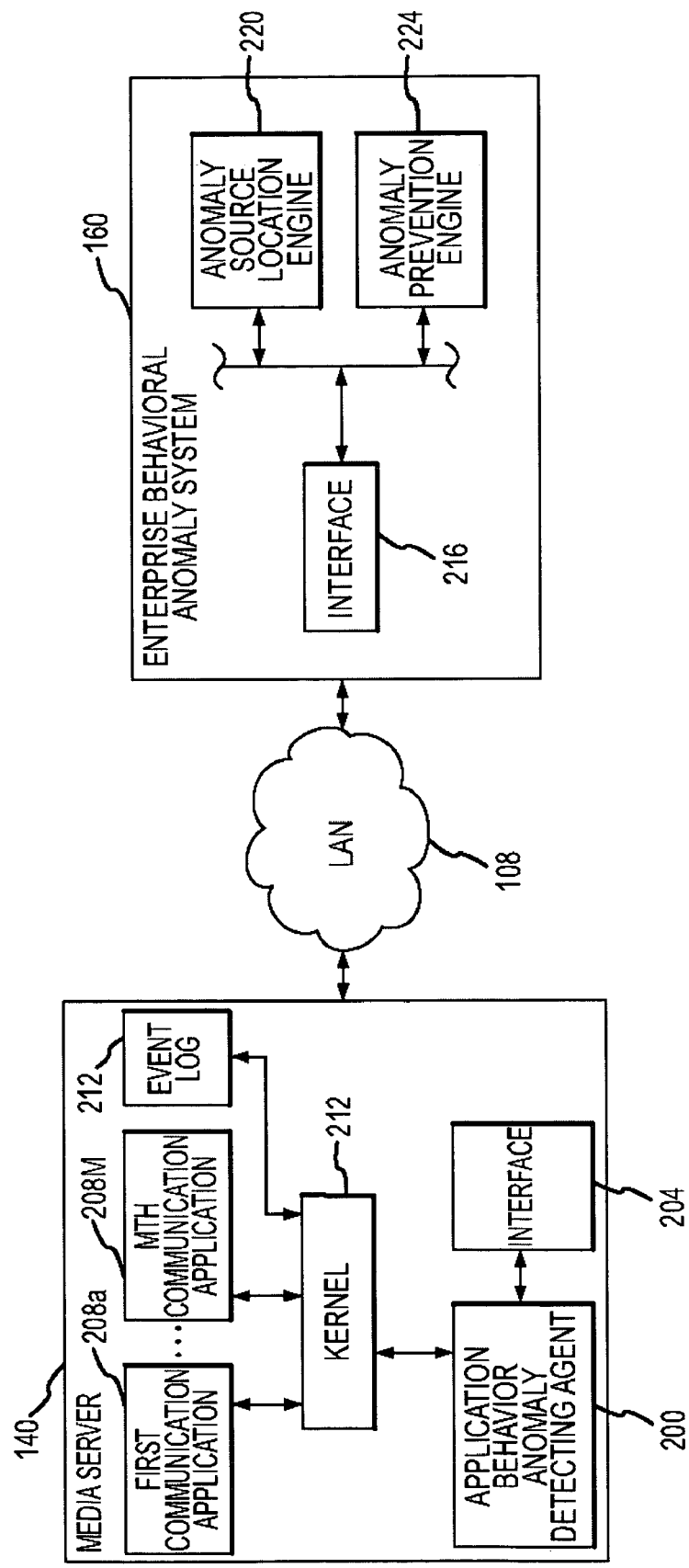
FIG. 2 is a block diagram of the components of an enterprise behavioral anomaly system according to an embodiment of the present invention.

Referring to FIG. 2, included in the memory of the media server 100 is an application behavior anomaly-detecting agent 200 and associated application programming interface 204 (collectively shown as the application behavior anomaly detector 180 of FIG. 1). The agent 200 updates the local hosts security policy to mitigate an intrusion and notifies the enterprise behavioral anomaly system 160 to respond in an appropriate manner to the intrusion. The agent 200 receives, directly from an application, such as the first ... mth communication applications 208*a-m* and/or from an event log 212, application-level information. The application layer-level information is generally from the normal processing operations of the applications 208*a-m* and includes error, exception, policy, and rate-handling or handling rate information. The event log 212 may also serve as an API between applications and the application behavior anomaly detecting agent 200.

An "error" refers to a discrepancy between a computed, observed, and/or measured value or condition and the true, specified, or theoretically correct value or condition, and an "exception" to an unusual event (e.g., an event that violates a rule or policy, an interruption to a normal flow of a program). The error and/or exception may be associated with any number of features or events, including a syntax (e.g., Abstract Syntax Notation violation, packet formatting error, etc.), a string length, session type and/or length, stack state (e.g., overflow), buffer state (overflow), memory state (e.g., full), input/output state (e.g., input/output problems with an unopened file or attempting to read a file that is not at the stated location), application semantics, parameter processing (e.g., division-by-zero), protocol (e.g., a protocol violation or protocol-related state), queue state (e.g., a volume of text, facsimile, and/or audio messages in a subscriber queue from a common source), handling state, packet traffic pattern, and packet traffic volume. As will be appreciated, an error may be the cause of an exception condition, and an exception may be the cause of an error condition.

A "policy" refers to a network administrative rule, restriction, or limitation imposed on a network component or subscriber. The policy may be associated with any number of actions, including login privileges, login attempts, use privileges (e.g., calling privileges), informational access privileges, and right to use or license restrictions.

"Rate handling" refers to a rate of occurrence of a selected event. Examples of rate handling include a rate of receipt of a type of signal, half open connection rate, port scan rate, network scan rate, and Central Processor Unit usage rate.

The first ... mth communication applications 208 are software programs that each carry out a useful communications-related task. The task, for example, may be voice contact admission control, voice contact setup, voice contact termination, electronic mail receipt and/or delivery, instant message receipt and/or delivery, receipt and/or delivery of other forms of text messages, voice message receipt and/or delivery, contact resource management, and the like.

Examples of communication applications include Avaya Inc.'s Definity™, Communication Manager™, Multi-Vantage™, Modular Messaging™, and Converged Communication Server™ products.

As can be seen from FIG. 2, the application behavior anomaly detecting agent 200 operates at or above the operating system level. FIG. 2 specifically depicts the agent 200 as operating at the kernel level. As will be appreciated, the kernel is the level of an operating system or networking system that contains the system-level commands or all of the functions hidden from the user. In some operating systems, the kernel is a program that contains the device drivers, the memory management routines, the scheduler, and system calls. This program is always running while the system is operating. Alternatively, the agent 200 can operate at the Application Layer as part of the application itself.

After receiving the application level information, the agent 200 analyzes the information to identify events that, taken alone or in connection with information gathered at other OSI model layers, may be indicative of an attack. The analysis may take many forms. In one configuration, the analysis compares the application-level information against a first signature file containing attack signatures for a plurality of differing types of attacks and/or that uses generic policy or rule and/or heuristics indicative of specific attack signatures or a combination of specific attack signatures. The first signature file may be behavior- and/or pattern-based.

For example, a signature of a DoS attack known as "TCP SYN flood" is a number of half open connections in excess of a selected threshold. A "TCP SYN flood" attack occurs when the first message of a three-way handshake exchange is sent from a spoofed source address that is currently not in use, and the server responds to the spoofed address with the second of the three messages. The third message will not be received at the server because there is no system to receive and respond to the second message. This causes a half-open connection to exist at the server, which consumes server resources. If enough of these half-open connections are created, the server may become so resource-constrained that it is unable to respond to legitimate connection requests, thereby resulting in a DoS situation. Uniform Datagram Protocol and Internet Control Message Protocol floods work in a similar manner. The agent 200 would detect the opening of the half-open connections is above a selected threshold and flag the behavior as a signature of a potential attack profile.

Additional examples of attack signatures and/or rules/heuristics that may be applied by the agent 200. In another example, the number of events from a single source IP address in a fixed time period may be counted and compared to a threshold. By way of illustration, threshold values may define what constitutes a fast scan or a slow scan. Yet another example is receipt of a packet that is not well formatted, malformed, or fragmented, which can denote a DoS attack or a buffer overflow situation. Yet another example of an attack signature is a rate of receipt of a General Request Packet or GRQ packet that is above a selected threshold. Such a condition is indicative of a DoS attack condition. As will be appreciated, the communication application receiving the GRQ requests will needlessly consume memory and processing resources. Yet another example of an attack signature is, within a selected time period, a number of unsuccessful attempts to log into a root account that is above a threshold number of attempts.

When a potential attack or attack indicator is identified, application-level attack information, which is preferably meta-data or data describing database objects, is provided to the enterprise behavioral anomaly system 160, typically in a secure communication. The application-level attack information includes source information associated with the attacker, the addresses of the source making the attack and the destination of the attack (e.g., a transport layer address, Media Access Control or MAC address, application layer identity such as SIP Uniform Resource Indicator, instant message handle, and the like), type of access of the attack (e.g., wireless, remote, local, etc.), type of violation (i.e., type of error, exception, policy or rule violation, or rate handling issue), and port information (e.g., port identifier(s) used for the attack packet(s) and type such as a Transport Control Protocol or TCP port or Uniform Datagram Protocol or UDP port), the number of attack attempts, an indicator of the likelihood of an attack in fact occurring, and an indicator of the severity or significance of the attack. As will be appreciated, the transport addresses of the source and destination can be obtained readily from an application processing log. As will be appreciated, port information may include multiple port identifiers. An attack may use different ports for control and data or for differing types of data.

The values of the indicators of the likelihood of an attack in fact occurring and of the severity of the severity or significance of the attack can be based on the first signature file. Some violations are more indicative of an attack than others and/or have a greater level of importance than others. In an attack indicator table, each type of violation can have an associated level of likelihood and/or of importance. When the type of violation is determined, it can be mapped to the attack indicator table to provide the corresponding indicator values.

Referring again to FIG. 2, the enterprise behavioral anomaly system 160 includes an interface 216 for receiving information from the agent 200 and other network monitoring device(s) 156, an anomaly source location engine 220 for comparing the received information (from different OSI layers) against a second signature file containing attack signatures for a plurality of differing types of attacks and/or that uses generic policy or rule and/or heuristics indicative of specific attack signatures or a combination of specific attack signatures and locates the source of the attack and an anomaly prevention engine 224 to take an appropriate response based on the type and source of the attack.

The source location engine 220 compares the second signature file against received information from different layers, including the Application Layer 7, the Presentation Layer 6, the Session Layer 5, the Transport Layer 4, the Network Layer 3, the Data Link Layer 2, and/or the Physical Layer 1 and can provide a second set of indicators of the likelihood of an attack in fact occurring and of the severity of the severity or significance of the attack. The second signature file typically includes attack signatures or predetermined conditions signaling a type of attack (or describing a set of one or more conditions describing a type of attack event), heuristics, and generic policy rules. When policy rules are specified, the rules preferably include condition parts describing characteristics of an attack, which are used to determine when the rule is triggered. The engine 220 may reduce the number of events in the received information by associating discrete events at differing OSI layers as being associated with a common event or attack. This judgment may be predetermined or part of a user-defined rule set. As noted and if necessary, the engine 220 further uses the received information to map and locate the access-level source.

The type of attack and indicators are used by the prevention engine 224 in selecting an appropriate attack response. Possible actions that may be taken in response to an attack include, without limitation:

(i) discarding the packet being processed, (ii) connection limiting (e.g., limiting the resources/traffic associated with the connection), (iii) blocking or neutralizing a particular transport address (e.g., by adjusting an Address Resolution Protocol or ARP cache or routing table, updating a policy (or access control list to block the attack) on the firewall 124, and subsequently dropping a deny filter rule into the network to it to shun subsequent traffic, (iv) restricting the bandwidth available to the attacker, (v) adjusting the TCP window sizes for the identified attack source so that the rate of the attack is significantly slowed, (vi) notifying a remotely located trusted peer from which the attack is emanating to further drill-down and act upon the attack, (viii) cloaking or decoying the attacker, such as by honey-potting, and (ix) reporting the attack to one or more enterprise administrative entities (e.g., sending an alert to an external management component, writing event records to a system log and/or console, recording packets associated with attack activities in a trace or other repository, and/or writing statistics records on normal behavior as to what constitutes abnormal behavior indicative of an attack).

In one configuration, the engine 224 in the first enterprise network (or domain) 100 determines whether the required remediation is local (intra-enterprise) or remote (inter-enterprise) and, if remote, in addition to undertaking local remedial actions notifies a trusted peer, such as the session border controller 136, in the second enterprise network 104 (or domain) of the attack profile, typically via a secure communication. The trusted peer in the second enterprise network, using the meta-data received from the engine 224 in the first enterprise network, further drills down and acts upon the identified attack source. The meta-data includes, for example, the type of attack, the source address associated with the attack (e.g., a transport layer address, MAC address, application layer identity such as SIP Uniform Resource Indicator, instant message handle, and the like), the number of attack attempts, the type of access, and the type of violation. Codes could be employed in the meta-data, which the enterprise can look up in a mutually shared storage location, such as yellow or green pages. Alternatively, the meta-data could include a pointer, such as a Universal Resource Locator, that provides relevant information. The trusted peer may be assigned a standard or proprietary SIP extension to facilitate transfer of the meta-data. The second enterprise's enterprise behavioral anomaly system (not shown) may optionally respond with the outcome of the drill-down effort.

This configuration permits a dedicated Intrusion Prevention System or IPS to serve as a Session Initiation Protocol (SIP) intermediary, or as the front-end to the formal SIP server. The intermediary or proxy can track the same vulnerabilities but within the aegis of policy-level/application-level signature updates. Thus, the functionality of the IPS system can be consolidated into a SIP intermediary, such as a session border controller. In one configuration, the functionality of the IPS is incorporated into a firewall, such as an XML firewall, and the firewall acts as a proxy for the type of communication application needing IPS monitoring and protection. Although the trusted peer is depicted in FIG. 1 as being a session border controller, it is to be understood that the peer can be a number of other components including a media server, gateway, registrar, proxy server, location server, presence server, and the like.

The operation of the agent 200 and system 160 will now be described with reference to FIGS. 3-4.

Figure 3:
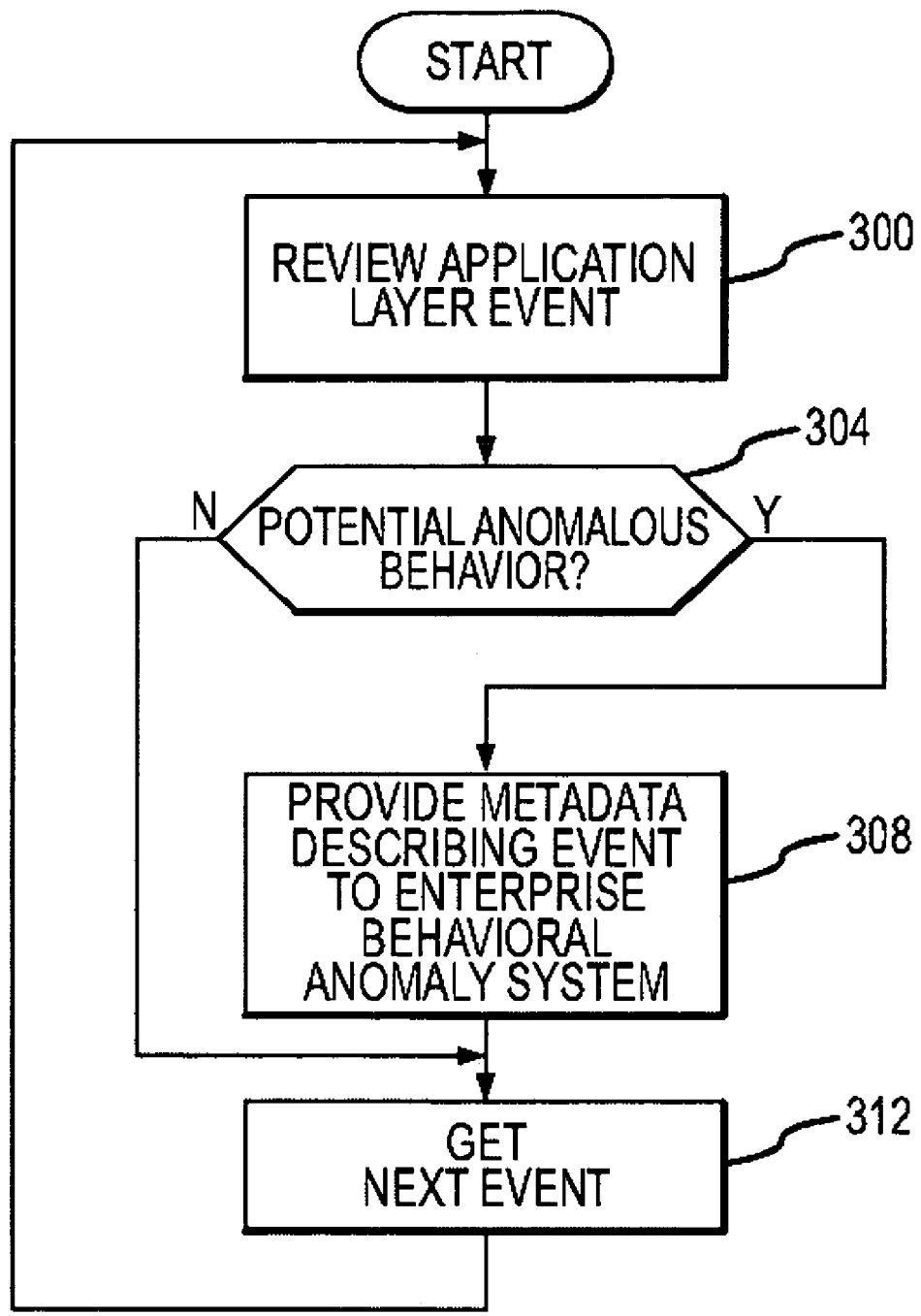
FIG. 3 is a flow chart of an operational embodiment of an application behavior anomaly detecting agent according to an embodiment of the present invention.

Referring to FIG. 3, the agent 200, in step 300, selects and reviews an application-layer event received from a communications application 208*a-m* and/or logged in the event log 212.

In decision diamond 304, the agent 200 determines whether the selected event is indicative of a potential anomalous behavior. As noted, this is preferably effected by comparing the event to the first signature file and attempting to match the event to an attack profile, rule, and/or heuristic in the file. If a match is identified, the agent 200 further determines corresponding likelihood and significance indicators, if appropriate, in a first set of indicators.

When a match exists, the agent 200, in step 308, initiates a secure communication with the enterprise behavioral anomaly (prevention) system 160 and provides meta-data describing the selected event and the associated violation(s) in the first signature file to the system 160.

When no match exists or after step 308, the agent 200 gets a next event and returns to and repeats step 300.

Figure 4:
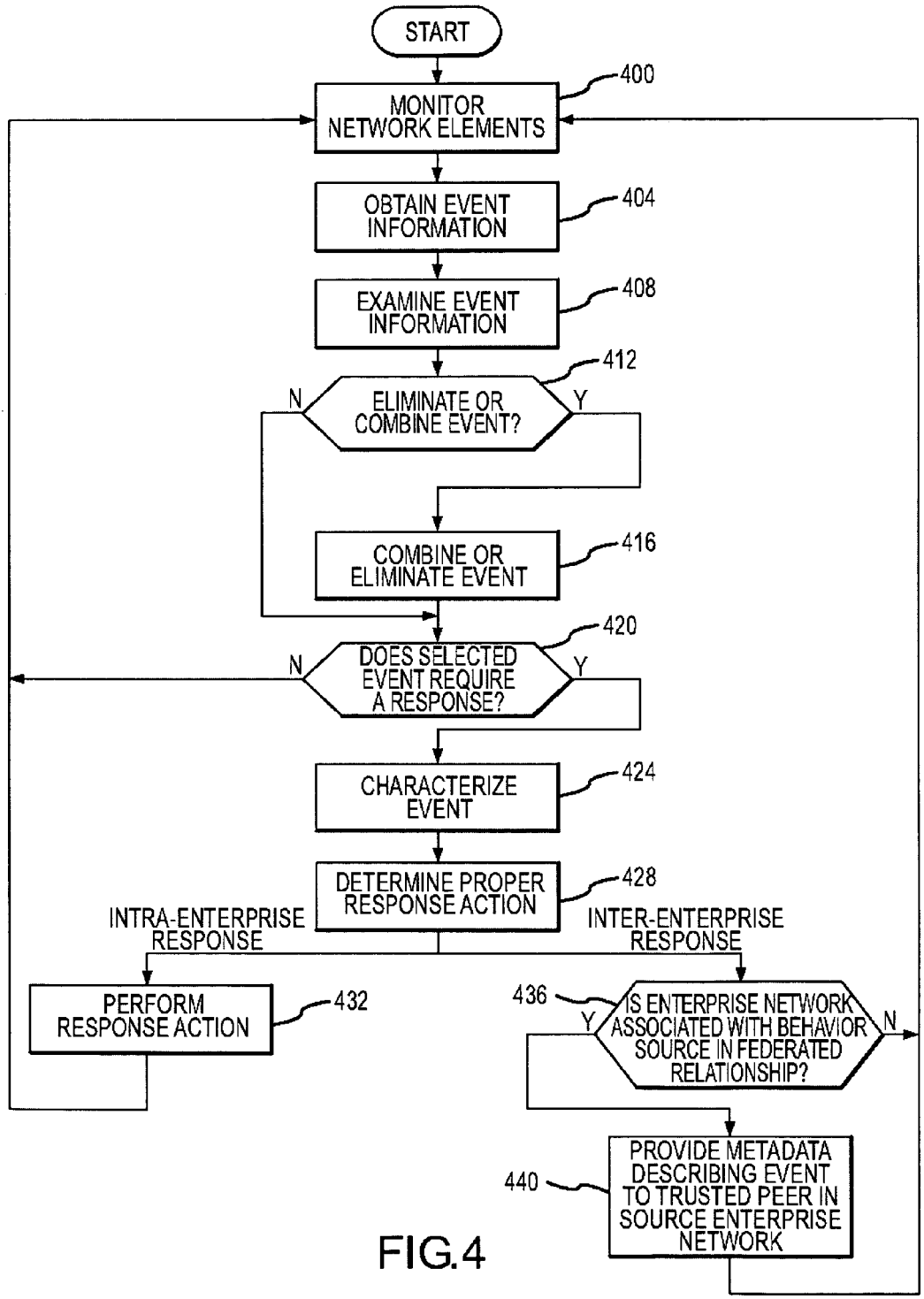
FIG. 4 is a flow chart of an operational embodiment of an enterprise behavioral anomaly system according to an embodiment of the present invention.

Referring to FIG. 4, the operation of the enterprise behavioral anomaly system 160 will now be described.

In step 400, the system 160 monitors the network elements for attack-related event information. In other words, the system 160 awaits attack-related event information from the agent 200 and/or network monitoring device(s) 156.

In step 404, the system 160 obtains event information.

In step 408, the event information is examined by the anomaly source location engine 220 to determine whether it corresponds to an attack. This typically involves comparison of the event information to information obtained from other network monitoring devices at other OSI model layers and to historical event information. Data mining techniques may be employed in this step to detect patterns, associations, changes and anomalies. As will be appreciated, commonly used data mining algorithms include link analysis, clustering, association, rule abduction, deviation analysis, and sequence analysis. In this step, the engine 220 determines not only whether the event information corresponds to an attack but also the type and source of attack and a second set of likelihood and significance indicators.

In step 412, the engine 220 determines whether the event identified in the event information may be eliminated or combined with another event or set of events. An event is eliminated when it fails to correspond to an attack and/or when it is deemed to be insignificant (or have likelihood and/or significance indicator values below a corresponding selected threshold). The event is combined when it is related to an existing event or set of events. For example, events associated with similar attacks or attackers coming from the same source may be combined into a single event if the similar attacks meet a similarity criterion (e.g., associated with a common transport address, port, and the like).

If the event can be eliminated or combined, this is done in step 416.

In decision diamond 420, the anomaly prevention engine 224 determines whether the selected event requires a response. The engine 224 makes this determination by using response rules maintained in a rule set. The engine 224 maps the attack type, and indicators to the rule set to determine the appropriate response. If the engine 224 finds a match, the engine 224, in step 424, characterizes the event and, in step 428, determines the appropriate response. If no match is found or if the match indicates no response is needed, the engine 224 terminates operation as to the event, and the system 160 returns to and repeats step 400.

As noted, there are two possible types of responses. One type of response is an intra-enterprise response, and the other is an inter-enterprise response. The intra-enterprise response, in step 432, is typically one of (i), (ii), (iii), (iv), (v), (vii), (viii), and (ix) above. In one configuration, step 432 may be characterized as local action/response (in-system) and in-network action/response (in-network but inside the same administrative domain).

Prior to performing the inter-enterprise response, which is (vi) above, the agent 224 first determines whether a source enterprise network associated with the source of the behavior is in a federated relationship with the monitoring enterprise network. This is typically done by checking a whitelist (or set of trusted identities such as trusted peer transport addresses) and/or blacklist (set of untrusted identities, such as untrusted peer transport addresses). As will be appreciated, a white list is a listing of peer addresses that are in a trusted relationship with the corresponding enterprise network. In one configuration, each trusted enterprise network has a subset of subscriber addresses listed on the list. A black list is a listing of untrusted peer addresses. If the source enterprise network is in a federated relationship with the monitoring enterprise network, the agent 224, in step 440, opens a secure communication channel with the source enterprise network and forwards to a trusted peer in the source enterprise network secure communications including the meta-data describing the event. In one configuration, the meta-data is exchanged using a data (media) or control (signaling) channel of a voice and/or text messaging communication application or established using a voice and/or text messaging communication protocol, such as SIP or H.323. In one configuration, the meta-data is exchanged using eXtended Markup Language or XML over the Simple Object Access Protocol or SOAP. If the source enterprise network is not in a federated relationship with the monitoring network or after performing step 440, the engine 224 terminates operation as to the event, and the system 160 returns to and repeats step 400.

A number of variations and modifications of the invention can be used. It would be possible to provide for some features of the invention without providing others.

For example in one alternative embodiment, the functions of the application behavior anomaly detecting agent 200 and enterprise behavioral anomaly system 160 are redistributed. For example, the intelligence of the agent 200 can be moved to the system 160 with the interface 204 remaining at the application layer to permit the agent 200 to obtain access to application level event information.

In another alternative embodiment, the agent 200 and enterprise behavioral anomaly system 160 components are implemented in hardware (e.g., a logic circuit such as an Application Specific Integrated Circuit or ASIC) and/or software.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An intrusion prevention method executing in an enterprise network, the method comprising:
providing a media server, the media server operable to direct communication contacts between two or more communication devices, wherein the media server comprises a processor, a memory, and an application behavior anomaly detector, wherein:
the application behavior anomaly detector receiving application level information from a communication application, wherein the communication application executes a communications-related task;
the application behavior anomaly detector selecting at least one event, at the application layer, from the application level information, the selected event being at least one of an error, exception, policy violation, and handling rate;
the application behavior anomaly detector detecting a potential attack;
the application behavior anomaly detector sending application-level attack information to an enterprise behavioral anomaly system;
providing an enterprise behavioral anomaly system in communication with the media server, which comprises a processor and memory, executing an interface, anomaly source location engine, and an anomaly prevention engine, wherein:
the interface receiving the application-level attack information;
the anomaly source location engine locating, with the application-level attack information, an access-level source for the potential attack;
when the application-level attack information is indicative of the intrusion, locating at least one of an entry point and an address of a source of the intrusion; and
when the application-level attack information is indicative of an intrusion, the anomaly prevention engine implementing an appropriate response to the intrusion, wherein implementing the appropriate response comprises blocking or neutralizing a particular transport address.

2. The method of claim 1, wherein the application layer event is at least one of an error and exception and wherein the at least one of an error and exception is associated with at least one of the following: a syntax, a string length, session type, session length, stack state, buffer state, memory state, input/output state, application semantic, parameter processing, protocol, queue state, handling state, packet traffic pattern, and packet traffic volume.

3. The method of claim 1, wherein the application layer event is a policy violation and wherein the policy violation is associated with at least one of the following: login privilege, login attempt, use privilege, informational access privilege, and right to use restriction.

4. The method of claim 1, wherein the application layer event is a handling rate and wherein the handling rate is associated with at least one of a rate of receipt of a type of signal, a half open connection rate, a port scan rate, a network scan rate, and a Central Processor Unit or CPU usage rate.

5. The method of claim 1, wherein locating, with the application-level attack information, an access-level source for the potential attack comprises:
comparing the selected at least one event against a first signature file, the first signature file comprising at least one of intrusion signatures and rules indicative of specific intrusion types; and
wherein, the application-level attack information comprises a plurality of source information associated with the intruder, an address of the source making the intrusion, an address of the destination of the intrusion, a type of access of the intrusion, a type of violation, an identifier and/or type of a port used by the intrusion packet, a number of intrusion attempts, an indicator of the likelihood of an intrusion in fact occurring, and an indicator of the significance of the intrusion.

6. The method of claim 5, wherein locating, with the application-level attack information, an access-level source for the potential attack further comprises:
determining whether the selected event corresponds to at least one other event performed at a lower layer of the Open Systems Interconnection Model;
when the selected event corresponds to at least one other event, associating the selected event and at least one other event;
comparing the selected at least one event against a second signature file, the second signature file comprising at least one of intrusion signatures and rules indicative of specific intrusion types and an appropriate response for each type of intrusion; and
implementing an appropriate response to the intrusion comprises, based on the comparison step (h3), implementing the appropriate response to the type of intrusion corresponding to the selected event.

7. The method of claim 1, wherein detecting a potential attack comprises:
determining that the selected application layer event is indicative of an intrusion;
determining an address of a source of the intrusion;
when the address of the source of the intrusion is associated with a second enterprise network, determining whether the first enterprise network is in a federated relationship with the second enterprise network; and
when the first enterprise network is in a federated relationship with the second enterprise network and when the address of the intrusion source is associated with the second enterprise network, providing a trusted peer in the second enterprise network with information describing the intrusion.

8. The method of claim 7, wherein the trusted peer is provided with the information describing the intrusion via at least one of a control and data channel established using a voice and/or text communication protocol.

9. An enterprise network, comprising:
a plurality of communication applications operable to execute communications-related tasks;
a media server operable to direct communication contacts between two or more communication devices, the media server comprising:
a memory;
a processor in communication with the memory, the processor operable to execute:
an application behavior anomaly detecting agent operable to:
select at least one event at the application layer, the selected at least one event being at least one of an error, exception, policy violation, and handling rate identified by one or more of the plurality of communication applications;
when a selected application layer event is indicative of potential anomalous behavior, provide metadata about the selected application layer event to an enterprise behavioral anomaly system;
the enterprise behavioral anomaly system in communication with the media server, the enterprise behavioral system comprising:
a second memory;
a second processor in communication with the second memory, the second processor operable to:
examine the metadata to determine whether the metadata corresponds to an intrusion;
combine the metadata with second information about a second event, wherein the metadata and the second information are associated with a similar intrusion;
when the selected application layer is indicative of the intrusion, locating at least one of an entry point and an address of a source of the intrusion; and
determine an appropriate response to the similar intrusion; and
implement the appropriate response to the intrusion, wherein
operation to implement the appropriate response to the intrusion comprises blocking or neutralizing a particular transport address.

10. The media server of claim 9, wherein the event is at least one of an error and exception and wherein the at least one of an error and exception is associated with at least one of the following: a syntax, a string length, session type, session length, stack state, buffer state, memory state, input/output state, application semantic, parameter processing, protocol, queue state, handling state, packet traffic pattern, and packet traffic volume.

11. The media server of claim 9, wherein the event is a policy violation and wherein the policy violation is associated with at least one of the following: login privilege, login attempt, use privilege, informational access privilege, and right to use restriction.

12. The media server of claim 9, wherein the event is a handling rate and wherein the handling rate is associated with at least one of a rate of receipt of a type of signal, a half open connection rate, a port scan rate, a network scan rate, and a Central Processor Unit or CPU usage rate.

13. The media server of claim 9, wherein:
the operation to select at least one event at the application layer comprises comparing the selected at least one event against a first signature file, the first signature file comprising at least one of intrusion signatures and rules indicative of specific intrusion types; and the operation to provide metadata about the selected application layer event to an enterprise behavioral anomaly system comprises collecting the metadata, wherein the metadata comprises a plurality of source information associated with the intruder, an address of the source making the intrusion, an address of the destination of the intrusion, a type of access of the intrusion, a type of violation, an identifier and/or type of a port used by the intrusion packet, a number of intrusion attempts, an indicator of the likelihood of an intrusion in fact occurring, and an indicator of the significance of the intrusion.

14. The media server of claim 13, wherein:

the operation to examine the metadata to determine whether the metadata corresponds to an intrusion further comprises the suboperations:

determining whether the selected event corresponds to at least one other event performed at a lower layer of the Open Systems Interconnection Model;

when the selected event corresponds to the second event, associating the selected event and the second event;

the operation to combine the metadata with second information about a second event comprises comparing the combined metadata and the second information against a second signature file, the second signature file comprising at least one of intrusion signatures, rules indicative of specific intrusion types and an appropriate response for each type of intrusion; and the operation to implement the appropriate response to the intrusion comprises, based on the comparison in the operation to combine the metadata with second information about a second event, implementing the appropriate response to the type of similar intrusion corresponding to the selected event and the second event.

15. The media server of claim 9, wherein the application behavior anomaly detecting agent is in a first enterprise network;

wherein the comparison the operation to examine the metadata to determine whether the metadata corresponds to an intrusion comprises the suboperations of:

determining that the selected application layer event is indicative of an intrusion;

determining an address of a source of the intrusion;

when the address of the source of the intrusion is associated with a second enterprise network, determining whether the first enterprise network is in a federated relationship with the second enterprise network; and wherein the operation to implement the appropriate response to the intrusion comprises, when the first enterprise network is in a federated relationship with the second enterprise network and when the address of the intrusion source is associated with the second enterprise network, providing a trusted peer in the second enterprise network with information describing the intrusion.

16. The media server of claim 15, wherein the trusted peer is provided with the metadata describing the intrusion via at least one of a control and data channel established using a voice and/or text communication protocol.

17. An enterprise network, comprising:

a plurality of communication applications operable to execute communications-related tasks;

a media server operable to direct communication contacts between two or more communication devices, the media server comprising:

a memory;

a processor in communication with the memory, the processor operable to execute:

an application behavior anomaly detecting agent operable to:

select at least one event at the application layer, the selected at least one event being at least one of an error, exception, policy violation, and handling rate identified by one or more of the plurality of communication applications;

when a selected application layer event is indicative of potential anomalous behavior, provide metadata about the selected application layer event to an enterprise behavioral anomaly system;

the enterprise behavioral anomaly system in communication with the media server, the enterprise behavioral system comprising:

a second memory;

a second processor in communication with the second memory, the second processor operable to:

examine the metadata to determine whether the metadata corresponds to an intrusion;

when the selected application layer is indicative of the intrusion, locating at least one of an entry point and an address of a source of the intrusion; and determine an appropriate response to the intrusion;

providing two or more trusted peers with information about the intrusion; and implement the appropriate response to the intrusion, wherein operation to implement the appropriate response to the intrusion comprises blocking or neutralizing a particular transport address.

18. The media server of claim 17, wherein providing the two or more trusted peers with the information about the instruction further comprises:

determining an address of a source of the intrusion;

when the address of the source of the intrusion is associated with a second enterprise network, determining whether the first enterprise network is in a federated relationship with the second enterprise network; and when the first enterprise network is in a federated relationship with the second enterprise network and when the address of the intrusion source is associated with the second enterprise network, providing the trusted peer in the second enterprise network with the information describing the intrusion.

* * * * *